United States Patent [19]

Eickhoff et al.

[11] Patent Number: 5,041,064
[45] Date of Patent: Aug. 20, 1991

[54] SUPERIMPOSED STEERING GEAR FOR TRACKLAYING VEHICLES

[75] Inventors: Hans-Jürgen Eickhoff, Tettnang; Peter Tenberge, Friedrichshafen, both of Fed. Rep. of Germany

[73] Assignee: Zahnradfabrik Friedrichshafen AG, Fed. Rep. of Germany

[21] Appl. No.: 469,571

[22] PCT Filed: Oct. 5, 1988

[86] PCT No.: PCT/EP88/00888
§ 371 Date: Apr. 6, 1990
§ 102(e) Date: Apr. 6, 1990

[87] PCT Pub. No.: WO89/03335
PCT Pub. Date: Apr. 20, 1989

[30] Foreign Application Priority Data

Oct. 9, 1987 [DE] Fed. Rep. of Germany ....... 3734125

[51] Int. Cl.⁵ ............................................ F16H 47/04
[52] U.S. Cl. ..................................... 475/24; 475/18; 475/27; 475/28
[58] Field of Search ...................... 475/18, 19, 21, 22, 475/23, 24, 27, 28

[56] References Cited

U.S. PATENT DOCUMENTS

| 3,426,621 | 10/1965 | Mooney, Jr. et al. | 475/24 |
| 3,492,891 | 2/1970 | Livezey | 475/24 |
| 4,327,603 | 5/1982 | Zaunberger et al. | 475/23 X |
| 4,557,157 | 12/1985 | Oestmann | 475/22 X |
| 4,569,251 | 2/1986 | Greenwood | 475/28 X |
| 4,614,132 | 9/1986 | Hall, III | 475/23 |
| 4,682,515 | 7/1987 | Reed | 475/24 |
| 4,860,613 | 8/1989 | Hall, III et al. | 475/23 |
| 4,890,508 | 1/1990 | Zaunberger | 475/24 X |
| 4,960,404 | 10/1990 | Reppert et al. | 475/22 X |

FOREIGN PATENT DOCUMENTS

| 0014122 | 8/1980 | European Pat. Off. |
| 2412562 | 9/1975 | Fed. Rep. of Germany |
| 3012220 | 10/1981 | Fed. Rep. of Germany |
| 86/07324 | 12/1986 | World Int. Prop. O. |

Primary Examiner—Allan D. Herrmann
Assistant Examiner—Ryan W. Massey
Attorney, Agent, or Firm—Davis, Bujold & Streck

[57] ABSTRACT

In a superimposed steering gear (3) for tracklaying vehicles in which the steering power needed for turning is superimposed on the drive system via summarizing differentials and which has a hydrostatic-mechanical power branching summed up in a summarizing transmission (31), the power losses of the hydrostatic branch that works with poor efficiency are kept as small as possible and, at the same time, an infinite steering is made possible over all radial ranges. For this purpose, the summarizing transmission (31) is shiftable into steps that cover at least two radial ranges, a speed adaptation to the transmission components taking place at any given time in the shift points for an infinite transition.

9 Claims, 3 Drawing Sheets

SUPERIMPOSED STEERING GEAR FOR TRACKLAYING VEHICLES

The invention concerns a superimposed steering gear for tracklaying vehicles wherein the steering power required for turning is superimposed on the drive system via a neutral shaft and summarizing differentials and the neutral shaft is driven from a drive shaft of the steering gear via a hydrostatic-mechanical branching transmission which has a reversing transmission in its mechanical power branch and a hydrostatic unit of infinitely variable translation in its hydrostatic power branch. Both power branches being passed together into a summarizing transmission so that a desired steering radius can be adjusted within a mechanically shiftable radial range by changing the traverse angle of the hydrostatic unit.

In superimposed steering gears of the kind mentioned (German Patent No. 24 12 562), when using a hydrostatic-mechanical power branching steering, the radii both for left-hand and right-hand turns can be respectively adjusted within two mechanically shiftable radial ranges by infinite variation of the hydrostatic unit. Departing from the straight-ahead drive of the tracked vehicle, there is provided first in both steering directions a first radial range in which the whole steering power is conveyed via a hydrostatic unit and a stepdown gear rear-mounted on the neutral shaft. To this first radial range, which is delimited by the maximum negative and the maximum positive angle of the hydrostatic unit, there is attached at any given time an additional radial range which reaches down to the smallest steering radius and in which there takes place, by shifting two planetary transmissions, a summarization of the powers flowing in different directions of rotation over the hydrostatic and over the mechanical part.

Although only a small part of the steering power flows through the hydrostatic unit that works with poor efficiency, the required volume of construction of said unit and its power losses still are too great.

SUMMARY OF THE INVENTION

Therefore, the problem to be solved by the invention is to overcome said disadvantages and thus to accommodate in a given space an infinite hydrostatic-mechanical steering gear with the best possible efficiency.

This problem is solved by the fact that the summarizing transmission has at least two shiftable planetary-gear sets, one transmission component of each being connected with the drive shaft, via the reversing transmission, and one transmission component of each being connected with a hydrostatic shaft of the hydrostatic unit; the remaining transmission components can be coupled with the neutral shaft, by means of coupling shafts, for shifting at least two radial ranges according to the steering direction, the respective coupling shafts having equal speeds for infinite switching from one radial range to the next at a positive and negative maximum translation of the hydrostatic unit. Due to the fine distribution of the whole steering radius in individual radial ranges, on one hand, it is possible to minimize the power losses of the hydrostatic unit, which can also have a smaller volume due to the low flow of power over said hydrostatic unit and, on the other hand, a quicker change of the steering radii is possible, since a quick switch to another steering radii can take place in the mechanical part of the branching transmission.

When the summarizing transmission has two shiftable planetary-gear sets and, in order to produce a first radial range departing from the straight-ahead driving of the tracked vehicle, between the output shaft and the neutral shaft a stepdown transmission is shiftable in parallel, then in the maximum translation of the hydrostatic unit both coupling shafts must have equal speeds at the shift point of the separating clutches coordinated with them, while when the translation changes in the direction of an opposite maximum value, the second coupling shaft becomes infinitely quicker for smaller steering radii and the first coupling shaft becomes infinitely slower for larger steering radii up to a speed value resulting from the speed of the output shaft reduced by the step-down transmission. A continuously infinite speed change of the neutral shaft can be produced even if, at the time, there is shift from one planetary-gear set to the other within the summarizing transmission. Due to the simultaneous reduction of speed in one planetary-gear set upon the increase of speed on the coupling shaft of the other planetary-gear set, it is possible to avoid great idling losses.

A simpler and more compact construction of the stepdown transmission results by designing it as planetary-gear step wherein a ring gear is directly fastened on the neutral shaft while the planetary gears, brakable with the housing via the stem, are driven by the output shaft of the hydrostatic unit. In this radial range, the required steering radius is purely hydrostatically adjusted in both steering directions.

A compact reversing transmission is produced by the fact that in a direct through-drive step a central intermediate shaft of said reversing transmission can be directly coupled with the drive shaft while a reversal in the direction of rotation is operated via two planetary-gear transmissions, the sun gears of which are non-rotatably connected with the intermediate shaft, there taking place a reversal in the direction of rotation of the intermediate shaft by the planetary gears of the first planetary transmission and the planetary gears of the second planetary transmission firmly coupled on the housing by their stems.

An alternative design of the reversing transmission, which presupposes small radial dimensions, has double planetary gears of which one meshes with an external central gear driven by the drive shaft and the other with an internal central gear non-rotatably situated on an intermediate shaft which leads to the summarizing transmission. In the direct through-drive of the reversing transmission, the spider shaft is coupled with the drive shaft while, in a reversing step, the spider shaft can be firmly braked with the housing.

A reversing transmission can be optionally provided which likewise has double planetary gears the spider shaft of which is driven by the drive shaft, one planetary gear of the double planetary-gear set being connected via an internal central gear with the intermediate shaft and the other planetary gear meshing with an internal central gear which can optionally be coupled with the spider shaft (direct through-drive) or be firmly braked with the housing (reverse step).

Finally, there is also the possibility of providing a planetary-gear transmission as a reversing transmission wherein the drive shaft and the intermediate shaft can be directly coupled with each other while a reversing step is effected by means of a regressing bevel-gear transmission driven by the drive shaft and apt to be coupled with the intermediate shaft.

When, as proposed below, in the summarizing transmission an external central gear of the planetary-gear set coordinated with the first coupling shaft and a stem of the planetary-gear set coordinated with the second coupling shaft are jointly operatively connected with the hollow shaft, and their sun gears are fastened on the output shaft, it is possible in this manner to produce in the transition, from one radial range to the next, in the maximum value of the translation of the hydrostatic unit, coinciding speeds of the two coupling shafts between which the shift is to be carried out.

Finally, the superimposed steering gear can be compactly designed in axial dimensions and the driving elements are eliminated when the stepdown transmission is directly situated on the transmission end of the hydrostatic unit.

The invention is not limited to the combination of features of the claims. Other logical possible combinations result for the expert from the claims and separate features of the claims when the problem arises.

For further explanation of the invention, reference is made to the drawings in which four embodiments are shown in a simplified manner.

DESCRIPTION OF THE PREFERRED EMBODIMENT

Figure 1:
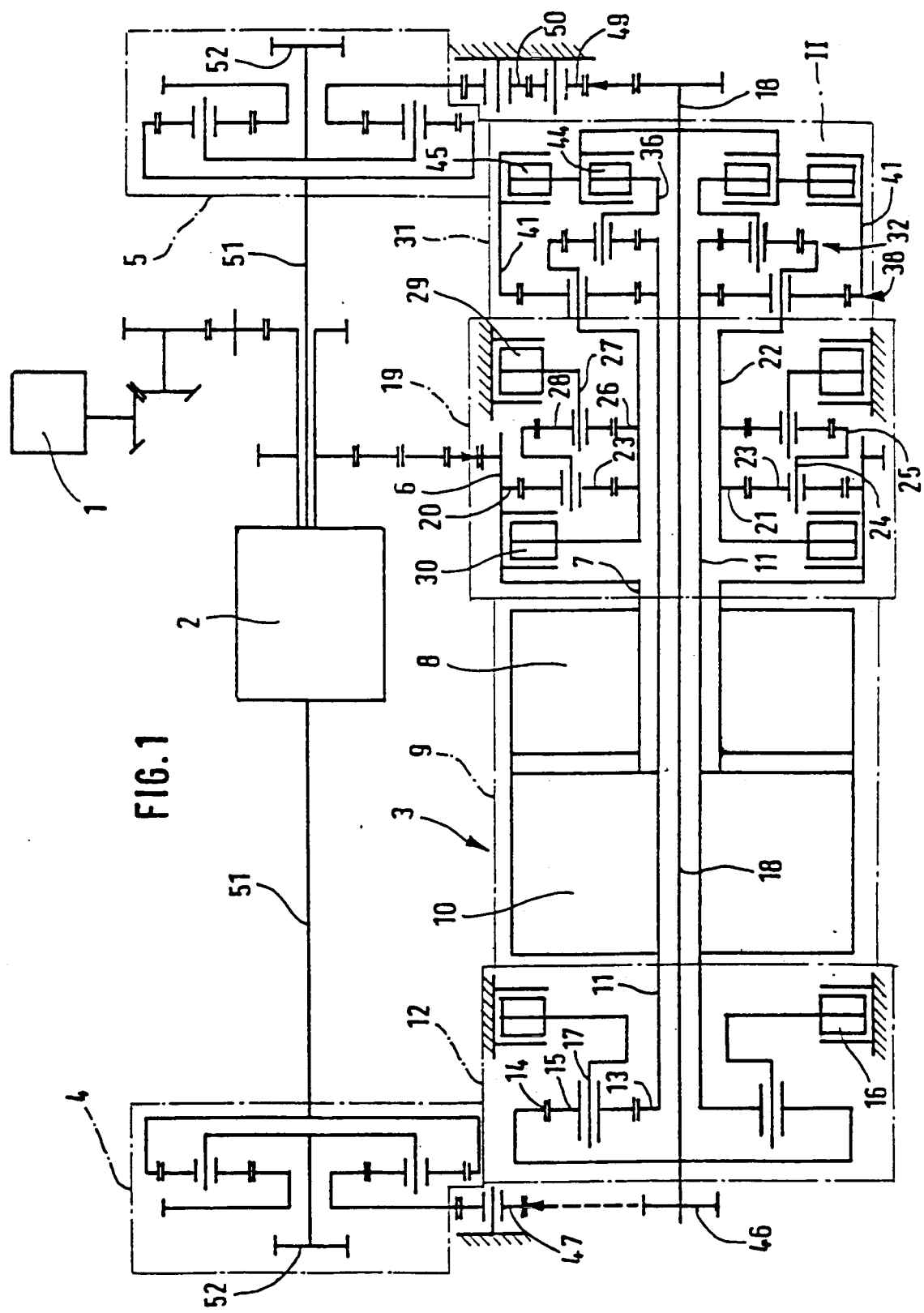
FIG. 1 is a diagrammatic illustration of a superimposed steering gear of a tracklaying vehicle according to the invention.

In FIG. 1, a drive unit of a tracklaying vehicle is shown consisting of an internal combustion engine 1, a gear-shift part 2, a superimposed steering gear 3 and a left-hand and a right-hand summarizing differential 4 and 5, respectively. The superimposed steering gear 3 is driven by a drive shaft 6 at a speed which stays at a consistent ratio in relation to the drive speed of the internal combustion engine 1.

The drive shaft 6 is, on one side, connected via an impeller shaft 7 with a hydraulic pump 8 of a hydrostatic unit 9, and in addition a hydraulic motor 10 belonging to the hydrostatic unit 9. The delivery rate of the hydraulic pump 8 is preferably regulatable while the hydraulic motor 10 has a constant absorption volume. A hydrostatic shaft 11 which, on one side, communicates with a stepdown transmission 12, is attached to the hydraulic motor 10 on the exit side. Said stepdown transmission 12 is constructed as a simple planetary-gear set, the sun gear 13 of which is directly fastened on the hydrostatic shaft 11, while the planetary gears 15 that mesh with the sun gear 13 and with a ring gear 14, are supported on a stem 17 which can be firmly braked with the housing via a brake 16. The ring gear 14 of the stepdown transmission 12 is, for its part, fastened on a neutral shaft 18 which forms the output component of the superimposed steering gear 3.

On the other side, a reversing gear 19, which shifts translations of +1 an −1, can be coupled with the drive shaft. The reversing gear 19 has a first planetary transmission, the external central gear 20 of which is connected non-rotatably with the drive shaft 6, while the internal central gear 21 of which engages an intermediate shaft 22. Planetary gears 23, supported on a planetary-gear carrier 24, are meshed with both the internal central gear 21 and the external central gear 20, said planetary-gear carrier 24 being, in turn, non-rotatably connected with a ring gear 25 of a second planetary gear of the reversing transmission 19. Planetary gears 28, supported on a stem 27, mesh with said ring gear 25 of the second planetary transmission and with a sun gear 26 which is likewise non-rotatably connected with the intermediate shaft 22. The stem 27 can be firmly braked with the housing by means of a brake 29. The intermediate shaft 22 has, in addition, a clutch 30 by means of which it can be directly coupled with the drive shaft 6.

Figure 2:
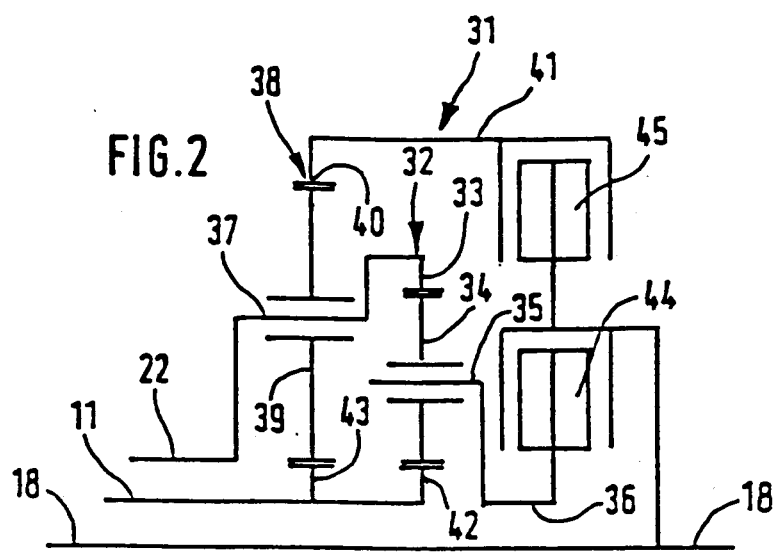
FIG. 2 is an enlarged section II from FIG. 1 in the area of a summarizing transmission of the superimposed steering gear.

A summarizing transmission 31 is attached to the reversing gear 19, the construction of which is explained with reference to the enlarged segment of FIG. 2. According to FIG. 2, the external central gear 33 of a first planetary-gear set 32 of the summarizing transmission 31 is driven by the intermediate shaft 22. Planetary gears 34, the stem 35 of which is connected with a first coupling shaft 36, are coordinated with said external central gear 33.

Besides, an operative connection exists between the intermediate shaft 22 and a stem 37 of a second planetary-gear set 39 of the summarizing transmission 31. On said stem 37, planetary gears which mesh with an external central gear 40 connected with a second coupling shaft 41 are supported. Both the internal central gear 42 of the first planetary-gear set 32 and the internal central gear 43 of the second planetary-gear set 38 are non-rotatably connected with the hydrostatic shaft 11. Finally, the neutral shaft 18 can be coupled with the first coupling shaft 36 via a clutch 44 or the second coupling shaft 41 via a clutch 45.

According to FIG. 1, the neutral shaft 18 is connected at one end, via a gear 46 and intermediate gear 47, with the summarizing differential 4. At its other end, the neutral shaft 18 is connected, via a gear 28 and two intermediate gars 49 and 50, with the summarizing differential 5. Besides, the summarizing transmissions 4 and 5 designed as planetary-gear transmissions are driven, starting from the transmission part, via transmission output shafts 51 and, on the exit side, each are connected with a sprocket gear 52 of the tracklaying vehicle. When turning, the summarizing differentials 4 and 5 are thereby overlaid with the differently oriented steering power from the superimposed steering gear 3.

Figure 3:
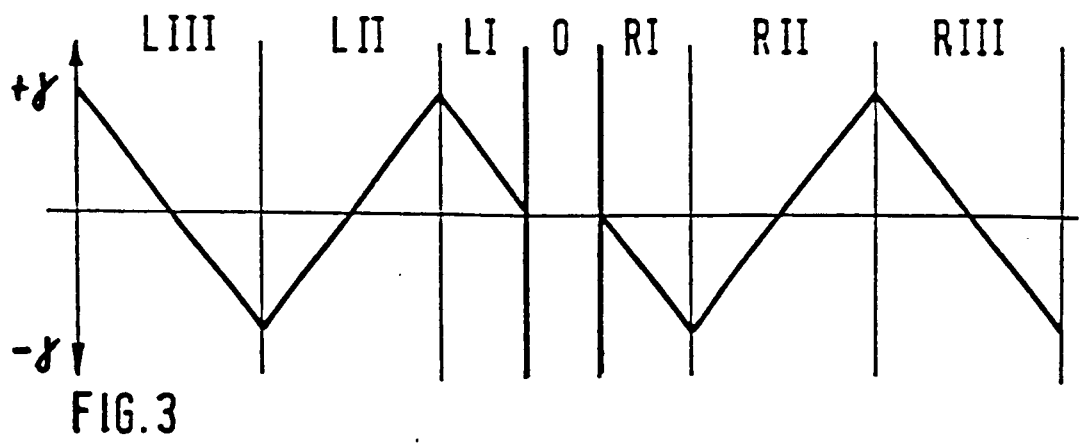
FIG. 3 is a diagram where the course of the angle of tranverse of the hydrostatic unit is coordinated with the separate radial ranges.

In the diagram of FIG. 3, the obtainable radial ranges for right-hand steering RI to RIII and for the left-hand steering LI to LIII are coordinated with the angle of traverse, that is, the changed flow rate of the hydraulic pump 8. There exists here a direct connection with the table of FIG. 4. In the table, the shifting elements of the reversing transmission 19, of the stepdown transmission 12 and of the summarizing transmission 31 are set forth to be acutated upon each change of the radial range. The shift elements to be actuated into the respective radial range are marked with dots.

Figure 4:
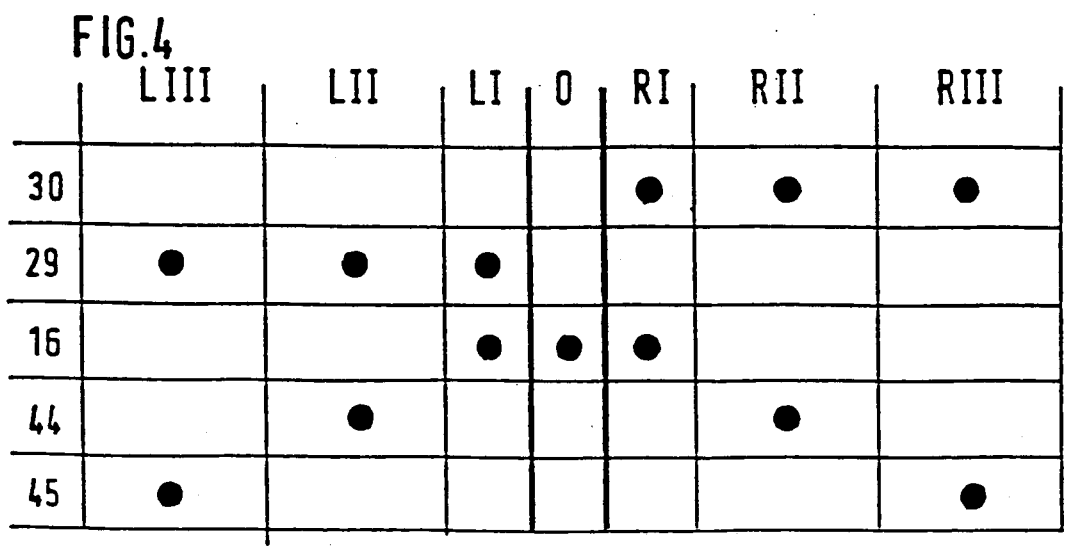
FIG. 4 is a table from which result the shifting elements that are actuated in the individual radial range.

The operation of the superimposed steering gear is explained with reference to the diagram of FIG. 3, to the table of FIG. 4 and to the diagrammatic illustration of the drive unit in FIG. 1:

When the tracklaying vehicle travels straight ahead, the hydrostatic unit 9 is in a position in which no power is transmitted from the drive shaft 6 to the neutral shaft, that is, the positioning angle of the hydraulic pump amounts to 0°. Since neither the shifting elements in the reversing transmission nor in the summarizing transmission are actuated over said power branch no power likewise is transmitted to the neutral shaft 18. The brake 16 of the stepdown transmission 12 is engaged for steering away from the neutral position.

If the superimposed steering gear 3 is now actuated in direction of a right-hand turn by adjusting the steering element, not shown, of the tracklaying vehicle, then the flow rate of the hydraulic pump changes by the change of its angle of traverse until reaching a maximum negative value $-\gamma_{max}$. The consequence of this is that the speed of the neutral shaft 18 changes in proportion to the change of the angle of traverse up to a negative value determined by the output speed of the hydrostatic unit 9 and the translation ratio of the stepdown transmission 12. The clutch 30 of the reversing transmission 19 is already actuated during said phase. In the radial range RI, with a maximum angle of traverse of the hydrostatic unit 9, the stepdown transmission 12 limits in the negative direction the speed of the neutral shaft 18 to a maximum value which corresponds to the speed of the first coupling shaft 36 driven with branched power via the hydrostatic shaft 11, the intermediate shaft 22 and the first planetary-gear set 32. An infinite changeover from the radial range RI to the radial range RII thus results by the fact that the first coupling shaft 36 is coupled by the clutch 44 with the neutral shaft 18 whereupon the brake 16 of the stepdown transmission 12 is released.

In the second radial range for right-hand steering RII, the speed of the intermediate shaft 22 corresponds to the speed of the drive shaft 6 since the reversing transmission is directly shifted through the actuation of the clutch 30. The steering power flows, branched over the hydrostatic unit 9 and the hydrostatic shaft 11, to the first planetary-gear set 32 of the summarizing transmission 31 while the mechanical portion of the steering power flows over the reversing transmission 19 and the intermediate shaft 22 to the first planetary-gear set 32. Within said radial range RII, the hydrostatic unit 9 is again adjusted to its maximum positive angle of traverse $+\gamma_{max}$. On the second coupling shaft 41 of the second planetary-gear set 38 there becomes adjusted, due to the power-branched drive of the stem 37 of the intermediate shaft 22 and of the internal central gear 43 of the hydrostatic shaft 11, at a maximum angle of traverse $+\gamma_{max}$, a speed corresponding to the speed of the neutral shaft 18 at that moment.

The clutch 45 is actuated in this state, that is, at a maximum positive angle of traverse of the hydrostatic unit 9, so that the second coupling shaft 41 is coupled with the neutral shaft 18. The clutch 44 of the first coupling shaft is then opened. In this third radial range, which includes the smallest turning radii, the hydrostatic unit 9 is again adjusted up to a maximum negative angle of traverse, the absolutely highest speed of the neutral shaft 18 resulting finally in this maximum value $-\gamma_{max}$ of the shifted radial range RIII so that by virtue of the high superimposed speed of different directions of rotation on the summarizing differentials 4 and 5, a smallest steering radius for the right-hand steering results.

In a left-hand turn of the tracklaying vehicle, the hydrostatic unit 9 and the summarizing transmission 31 act together basically in the same manner only that in the comparable radial range LI to LIII the angle of traverse of the hydrostatic unit is adjusted in an opposite direction. Besides, in said radial ranges LI, LII and LIII, unlike in the right-hand steering, it is the brake 29 instead of the clutch 30 that is actuated in the reversing transmission. Thus, a reversal in the direction of rotation on the mechanical power portion transmitted to the intermediate shaft 22 occurs in the reversing transmission 19. From FIG. 2, it can be seen that with the superimposed steering gear 3 built according to the invention, both the whole right and left turning radii of a tracklaying vehicle can be divided in three sections. The mechanical part (summarizing transmission 31, stepdown transmission 12 and reversing transmission 19) is selected in a manner such that the hydrostatic portion of the power branching is equally large in each section and thereby it is possible optimally to utilize the hydrostatic transmission unit in relation to its efficiency. Each whole radial range can basically be divided in more than three sections when deemed convenient by enlarging the summarizing transmission 31.

Figure 5:
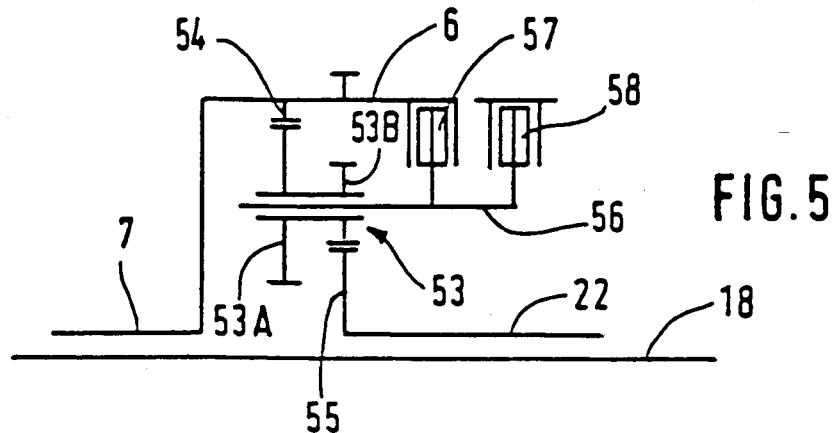
FIG. 5 is a alternative design of a reversing transmission.
Figure 6:
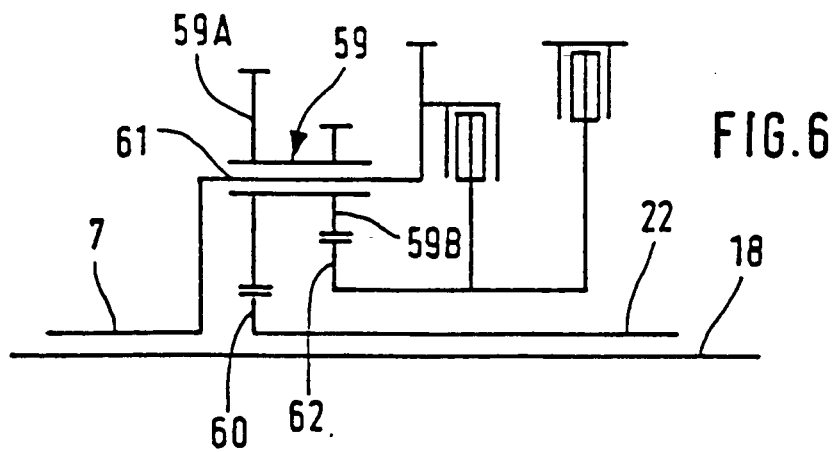
FIG. 6 is an alternative design of a reversing transmission.
Figure 7:
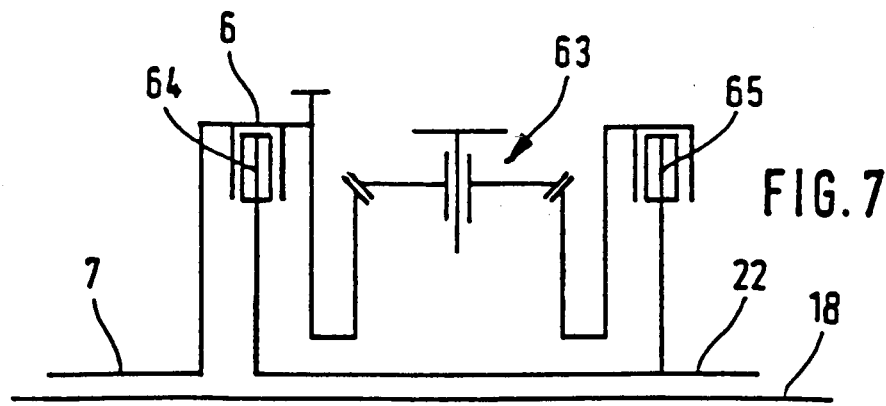
FIG. 7 is an alternative design of a reversing transmission.

In FIG. 5 to 7, three other variants of the construction of the reversing transmission 19 are shown. According to FIG. 5, the reversing transmission 19 has double planetary gears 53 of which one planetary gear 53A is engaged with an external central gear 54 driven by the drive shaft 6. The other planetary gear 53B is engaged with an internal central gear 55 situated on the intermediate shaft 22. A spider shaft 56, which is attached to an element that supports the double planetary gears 53, can be connected with the drive shaft 6 for a direct through-drive by means of a clutch 57 or can be braked firmly with the housing by means of a brake 53 for shifting of a reversing step.

In the embodiment of the reversing transmission 19 of FIG. 6, double planetary gears designated by 59 are provided, the planetary gear 59A of which meshes with an internal central gear 60 non-rotatably situated on the intermediate shaft 22. The other planetary gear 59B meshes with an internal central gear 62. The reversing transmission 19 of the drive shaft 6 is driven via a spider shaft 61, it being possible to couple the internal central gear 62 with the spider shaft 61 for shifting a direct through-drive and to brake the internal central gear 62 firmly with the housing for a reverse step.

Finally, in the embodiment of FIG. 7 the drive shaft 6 can be coupled with the intermediate shaft 22 via a clutch 64. To shift a reverse step, a regressing bevel-gear drive 63 is available, which is driven by the drive shaft 6 and can be coupled with the intermediate shaft 22 via another clutch 65.

Referenced numerals 1 internal combustion engine
2 gear shift part
3 superimposed steering gear
4 summarizing differential
5 summarizing differential
6 drive shaft
7 impeller shaft
8 hydraulic pump
9 hydrostatic unit 10 hydraulic engine
11 hydrostatic shaft
12 stepdown gear
13 sun gear
14 ring gear
15 planetary gears
16 brake
17 stem
18 neutral shaft
19 reversing transmission
20 external central gear
21 internal central gear
22 intermediate shaft
23 planetary gears
24 planetary-gear carrier
25 ring gear
26 sun gear
27 stem
28 planetary gears
29 brake
30 clutch
31 summarizing transmission
32 first planetary-gear set of 31
33 external central gear of 32
34 planetary gears of 32
35 stem of 32
36 first coupling shaft
37 stem of 38
38 second planetary-gear set of 31
39 planetary gears of 38
40 external central gear of 38
41 second coupling shaft
42 internal central gear of 32
43 internal central gear of 38
44 clutch
45 clutch
46 gear
47 intermediate gear
48 gear
49 intermediate gear
50 intermediate gear
51 transmission output shafts
52 sprocket gear
53 double planetary gears
53A planetary gears of 53
53B planetary gears of 53
54 external central gear
55 internal central gear
56 spider shaft
57 clutch between 6 and 56
58 brake
59 double planetary gears
59A planetary gears of 59
59B planetary gears of 59
60 internal central gear on 22
61 spider shaft
62 internal central gear
63 regressing bevel-gear drive
64 clutch between 6 and 22
65 clutch between 63 and 22

We claim:

1. A superimposed steering gear (3) for a tracklaying vehicle in which the steering power needed for turning the vehicle is superimposed on a drive system via a neutral shaft (18) and two summarizing differentials (4, 5), said neutral shaft (18) being driven by a drive shaft (6) of said steering gear via a hydrostatic-mechanical branching transmission which has a reversing transmission (19) in its mechanical power branch and a hydrostatic unit (9), including a hydrostatic shaft (11), with an infinitely variable translation in its hydrostatic power branch, both power branches being passed together into a summarizing transmission (31) so that a desired steering radius can be adjusted within a mechanically shiftable radial range by changing the angle of traverse of said hydrostatic unit (9), wherein said summarizing transmission (31) has at least two shiftable planetary-gear sets (32, 38), each gear set having one transmission component (external central gear 33, stem 37) connected, via said reversing transmission (19), to said drive shaft (6) and one transmission component (internal central gears 42, 43) connected to the hydrostatic shaft (11) of said hydrostatic unit (9), each remaining transmission component (stem 35, external central gear 40) being couplable with said neutral shaft (18) by means of first and second coupling shafts (36, 41) to result in at least two radial ranges according to the steering direction, said first and second coupling shafts (36, 41) having equal speeds for infinite reversal from one radial range to the next (LII-LIII or RII-RIII) at a maximum translation ($+\gamma_{max}$ or $-\gamma_{max}$) of said hydrostatic unit (9).

2. A superimposed steering gear having a summarizing transmission (31) with shiftable planetary-gear sets (32, 38) according to claim 1, wherein a stepdown transmission (12) is connected in parallel between hydrostatic shaft (11) and neutral shaft (18), said first and second coupling shafts (36, 41) have the same speeds at a maximum translation ($+\gamma_{max}$ or $-\gamma_{max}$) of the hydrostatic unit (9) and at a shift point of separating clutches (44, 45) coordinated with them, while upon a change of translation of said hydrostatic unit (9), in a direction of a respective opposite maximum value, said second coupling shaft (41) becomes infinitely quicker for small steering radii and said first coupling shaft (36) becomes infinitely slower for larger steering radii until a speed value resulting from the speed of said hydrostatic shaft (11) reduced by said stepdown transmission (12).

3. A superimposed steering gear for tracklaying vehicles according to claim 2, wherein said stepdown transmission (12) is designed as planetary-gear set, the sun gear (13) of which is connected with said hydrostatic shaft (11), a ring gear (14) of said planetary set is connected with said neutral shaft (18) and a stem (17) of said planetary-gear set is firmly braked to the housing by means of a first brake (16).

4. A superimposed steering gear for tracklaying vehicles according to claim 2, wherein said stepdown transmission (12) is directly situated on the transmission end of said hydrostatic unit (9).

5. A superimposed steering gear for tracklaying vehicles according to claim 1, wherein, said reversing transmission (19) has two planetary gears and, in a direct through-drive step of said reversing transmission (19), an intermediate shaft (22) can be coupled with said drive shaft (6) by means of a clutch (30), the sun gears (21, 26) of both planetary transmissions are non-rotatably connected with said intermediate shaft (22), said drive shaft (6) engaging an external central gear (20) of said first planetary-gear transmission, the planetary-gear carrier (24) of which is connected with a ring gear (25) of said second planetary transmission while, for a reversing step, a stem (27) of said second planetary transmission can be firmly braked to the housing, and translations of $+1$ and $-1$ between the drive shaft (6)

and said intermediate shaft (22) being shiftable by means of said reversing transmission (19).

6. A superimposed steering gear for tracklaying vehicles according to claim 1, wherein said reversing transmission (19) is designed as a planetary transmission having double planetary gears (53) one of which meshes with an external central gear (54) connected with said drive shaft (6) and the other of which meshes with an internal central gear (55) non-rotatably situated on an intermediate shaft (22) and a spider shaft (56) can be coupled, by means of a clutch (57), with said drive shaft (6) in the direct through-drive of said reversing transmission (19) and can be firmly braked to the housing by means of a brake (58) in a reversing step.

7. A superimposed steering gear for tracklaying vehicles according to claim 1, wherein said reversing transmission (19) is designed as a planetary transmission having double planetary gears (59) mounted on a spider shaft (61) which is driven by said drive shaft (6), one of said planetary gears is meshed with an internal central gear (60) situated on an intermediate shaft (22) leading to said summarizing transmission and the other of said planetary gears is meshed with an internal central gear (62) which can be coupled to said spider shaft (61) or firmly braked to the housing.

8. A superimposed steering gear for tracklaying vehicles according to claim 1, wherein said reversing transmission (19) is designed as a planetary-gear transmission and an intermediate shaft (22) leading to said summarizing transmission (31) can be coupled with said drive shaft (6) by said reversing transmission (19) for direct drive and a regressing bevel-gear transmission (63) is connectable between said drive shaft (6) and said intermediate shaft (22) for a reversing drive.

9. A superimposed steering gear for tracklaying vehicles according to claim 1, wherein in said summarizing transmission (31) an external central gear (33) of said planetary-gear set (32) coordinated with said first coupling shaft (36) and a stem (37) of said planetary-gear set (38) coordinated with said second coupling shaft (41) are operatively jointly connected with said intermediate shaft (22) and internal central gears (42, 43) thereof are fastened on said hydrostatic shaft (11).

* * * * *